(12) United States Patent
Tsuchiya et al.

(10) Patent No.: US 9,810,969 B2
(45) Date of Patent: Nov. 7, 2017

(54) LENS DRIVING APPARATUS

(71) Applicants: EST Co., Ltd., Nagano (JP);
AULA-DIUS LLC., Osaka (JP)

(72) Inventors: Takashi Tsuchiya, Nagano (JP);
Yasushi Takahashi, Tokyo (JP)

(73) Assignees: EST Co., Ltd., Nagano (JP);
AULA-DIUS LLC., Osaka (JP)

( * ) Notice: Subject to any disclaimer, the term of this patent is extended or adjusted under 35 U.S.C. 154(b) by 0 days.

(21) Appl. No.: 15/050,472

(22) Filed: Feb. 23, 2016

(65) Prior Publication Data

US 2016/0252702 A1    Sep. 1, 2016

(30) Foreign Application Priority Data

Feb. 26, 2015 (JP) .................. 2015-036401
Aug. 1, 2015 (JP) .................. 2015-003917

(51) Int. Cl.
| | | |
|---|---|---|
| *G02B 7/02* | (2006.01) | |
| *G03B 13/34* | (2006.01) | |
| *G02B 7/08* | (2006.01) | |
| *G03B 3/10* | (2006.01) | |
| *G03B 5/00* | (2006.01) | |

(52) U.S. Cl.
CPC ............. *G03B 13/34* (2013.01); *G02B 7/08* (2013.01); *G03B 3/10* (2013.01); *G03B 5/00* (2013.01); *G03B 2205/0046* (2013.01); *G03B 2205/0069* (2013.01)

(58) Field of Classification Search
CPC ........ G02B 7/102; G02B 7/022; G02B 7/023; G02B 7/04; G03B 3/10; G03B 13/34; G03B 2205/0069

USPC .................. 359/676–706, 822–826
See application file for complete search history.

(56) References Cited

U.S. PATENT DOCUMENTS

| | | | |
|---|---|---|---|
| 2008/0117536 A1* | 5/2008 | Higuchi ................ | G02B 7/102 359/824 |
| 2008/0253003 A1 | 10/2008 | Shin et al. | |
| 2009/0073585 A1 | 3/2009 | Yamashita | |
| 2010/0053784 A1 | 3/2010 | Kang et al. | |
| 2011/0236008 A1 | 9/2011 | Kang et al. | |
| 2014/0226224 A1* | 8/2014 | Cho ..................... | G02B 7/08 359/824 |
| 2014/0368937 A1 | 12/2014 | Seol et al. | |

FOREIGN PATENT DOCUMENTS

| | | |
|---|---|---|
| JP | 2013-235124 A | 11/2013 |
| JP | 2014-160196 A | 9/2014 |
| JP | 2014-197067 A | 10/2014 |

* cited by examiner

*Primary Examiner* — Mahidere Sahle (57) ABSTRACT

To provide a lens driving apparatus that drives a lens in its optical axis-direction without inclining it, and a lens driving apparatus that drives a bobbin in the optical axis-direction smoothly without increasing the frictional force between a ball arranged between the bobbin and a cover, and the bobbin and cover while maintaining high driving power. The lens driving apparatus comprises the polygonal cylindrical bobbin that houses the lens, the box-shaped cover that receives the bobbin, a drive unit that moves the bobbin in the optical axis-direction of the lens, and a support unit that supports the bobbin.

7 Claims, 14 Drawing Sheets

LENS DRIVING APPARATUS

BACKGROUND

1. Technical Field

The present invention relates to a lens driving apparatus that drives a lens.

The contents of the following Japanese patent application(s) are incorporated herein by reference:
NO. 2015-036401 filed on Feb. 26, 2015.

The contents of the following Japanese utility model application(s) are incorporated herein by reference:
NO. 2015-003917 filed on Aug. 1, 2015.

2. Related Art

A camera installed in a mobile phone or the like is provided with a lens driving apparatus that drives an optical element such as a lens to be used for image-capturing for purposes of focusing or zooming. Many lens driving apparatuses comprise a bobbin that holds an optical element, a cover that houses the bobbin therein, and a drive unit that moves the bobbin in the optical axis-direction of the lens.

When the bobbin is moved by the drive unit, a portion of the bobbin to which the drive unit is provided is moved by a predetermined distance. On the other hand, in some cases, the other portions are moved by distances that are not equal to the moving distance of the portion to which the drive unit is provided due to the gravitational force that acts in the opposite direction to the driving direction or the like, and the orientation of the bobbin inclines, which causes misalignment of the optical axis-direction of the lens. As a measure to solve this, a support unit that supports the bobbin to stabilize the orientation of the bobbin (the optical axis-direction of the lens) and guide the bobbin in the optical axis-direction is provided.

As such a support unit, one in which grooves facing each other are provided to the bobbin and the cover, and a spherical ball is arranged therein has been widely used. This is for suppressing the influence of a frictional force generated in the support unit when moving the bobbin, by the ball rotating while being in contact with the bobbin and the cover.

Conventionally, a drive unit is provided along one surface of a polygonal cylindrical bobbin having a rectangular section, and a support unit is provided along a surface facing the drive unit (please see Patent Literatures 1 and 2, for example). That is, the drive unit and the support unit are arranged in parallel. For this reason, for example, when the drive unit moves the bobbin upward, and the gravitational force that acts in the opposite direction to the moving direction acts on the support unit-side, it is difficult to move a surface of the bobbin to which the support unit is provided by a distance equal to the moving distance of a surface to which the drive unit is provided against the gravitational force, resulting in inclination of the bobbin relative to the cover, that is, to the optical axis.

Also, in order to drive the bobbin smoothly in the optical axis-direction, it is preferable to increase the driving force for example by increasing the size of a drive magnet to increase the magnetic force of the drive magnet.

However, for example if the magnetic force of the drive magnet is increased, the frictional force between a ball arranged between a bobbin and a cover, and the bobbin and the cover increases due to the magnetic attraction force between the drive magnet and the cover. For this reason, situations have occurred where the bobbin is not driven smoothly in the optical axis-direction even if the magnetic force of the drive magnet is increased.

PRIOR ART LITERATURES

Patent Literatures

[Patent Literature 1] Japanese Patent Application Publication No. 2013-061666

[Patent Literature 2] Japanese Patent Application Publication No. 2015-007804

An object of the present invention is to provide a lens driving apparatus that drives a lens in its optical axis-direction without inclining it, and a lens driving apparatus that drives a bobbin in the optical axis-direction smoothly without increasing the frictional force between a ball arranged between a bobbin and a cover, and the bobbin and cover while maintaining high driving power.

SUMMARY

A lens driving apparatus according to an aspect of the present invention comprises:

a polygonal cylindrical bobbin that houses a lens;

a box-shaped cover that receives the bobbin;

a drive unit that moves the bobbin in an optical axis-direction of the lens; and a support unit that supports the bobbin and guides the bobbin in the optical axis-direction, wherein the drive unit is configured with a coil and a drive magnet, the coil is mounted on at least one inner surface of inner surfaces of the cover, the drive magnet: is housed at a drive surface which is an outer surface of the bobbin and faces the coil; and has magnetic poles that are different at both sides in the optical axis-direction, the support unit is configured with a plurality of first grooves, a plurality of second grooves and balls, the plurality of first grooves are provided to at least two locations of an inner circumference of the cover, and extend in parallel with the optical axis-direction, the plurality of second grooves are provided to at least two locations of a periphery of the bobbin, extend in parallel with the optical axis-direction of the lens, and face respective ones of the plurality of first grooves, the number of the plurality of second grooves being the same as the number of the plurality of first grooves; and each of the balls is disposed between one of the plurality of first grooves and one of the plurality of second grooves facing the one of the plurality of first grooves, and at least one of the plurality of second grooves is provided to a support surface that is not parallel with the drive surface, and is approximately parallel with a detection magnet mounted on the periphery of the bobbin.

The second groove (a support unit) is provided to a support surface not parallel with the drive surface to which the drive unit is provided. Thereby, when a difference is generated between the moving distances of the drive surface and the surface facing it to cause inclination of the bobbin, the second groove provided to the bobbin inclines relative to the first groove provided to the cover. Due to the lengths of the first groove and second groove, separation between the positions of the two grooves that is generated due to the inclination becomes significant. This separation is prevented due to the ball within the grooves. That is, the bobbin never inclines. Note that the drive unit may be provided to not only one, but two or more surfaces. In this case, there are two or more drive surfaces, and there is a support surface that corresponds to and is not parallel with each of the drive surfaces. If the two or more drive surfaces are parallel with each other, there may only be one support surface not parallel with the drive surfaces.

In the lens driving apparatus according to an aspect of the present invention, at least one of the plurality of second grooves provided to the support surface and the plurality of first grooves facing the plurality of second grooves has a V-shaped section.

By having the V-shaped section, the groove width inside the groove becomes narrow. The ball is locked with the groove, and separation of the positions of the grooves can be surely prevented. Here, the "V-shape" means a shape whose groove width becomes narrower as the distance from the opening portion increases. The acute angle portion at the lower edge of the V-shape may be another shape.

The lens driving apparatus according to an aspect of the present invention comprises a detecting unit that detects a position of the bobbin, wherein the detecting unit is configured with: a base plate on which a hole element to be mounted on one of the inner surfaces of the cover is installed; and the detection magnet mounted on a detection surface which is an outer surface of the bobbin and faces the base plate.

The detecting unit is required for driving the lens. By providing the detection magnet here, when the bobbin is brought close to the magnetic body (iron) plate to be brought close to the cover, the ball disposed between the first groove and the second groove facing it is caused to be abutted on.

Furthermore, because the magnetic force of the detection magnet can be adjusted to be small while maintaining the high driving power by making the detection magnet and the drive magnet separate bodies, the frictional force can be reduced by adjusting the contact pressure between the ball arranged between the bobbin and the cover, and the bobbin and cover.

In the lens driving apparatus according to an aspect of the present invention, the detection magnet is provided at a position that allows the cover and the bobbin to be brought close to each other and allows the balls disposed between the plurality of first grooves and the plurality of second grooves facing the plurality of first grooves to abut on the plurality of first grooves and the plurality of second grooves.

The bobbin and the cover are brought close to each other on the support surface. The bobbin can be supported, and guided in the optical axis-direction by causing the ball to engage with the groove at a smaller inclination.

In the lens driving apparatus according to an aspect of the present invention, one of the plurality of second grooves is disposed at a portion of the detection surface, the portion corresponding to each of both sides of the base plate.

The bobbin is supported at both sides of the detection surface. Inclination of the bobbin relative to the detection surface can be surely prevented. In particular, this is effective when the detection surface is orthogonal to the drive surface.

With a lens driving apparatus according to one aspect of the present invention, it becomes possible to drive a lens without inclining it and smoothly in the optical axis-direction.

DESCRIPTION OF EXEMPLARY EMBODIMENTS

Hereinafter, (some) embodiment(s) of the present invention will be described.

[First Embodiment]

Figure 1A:
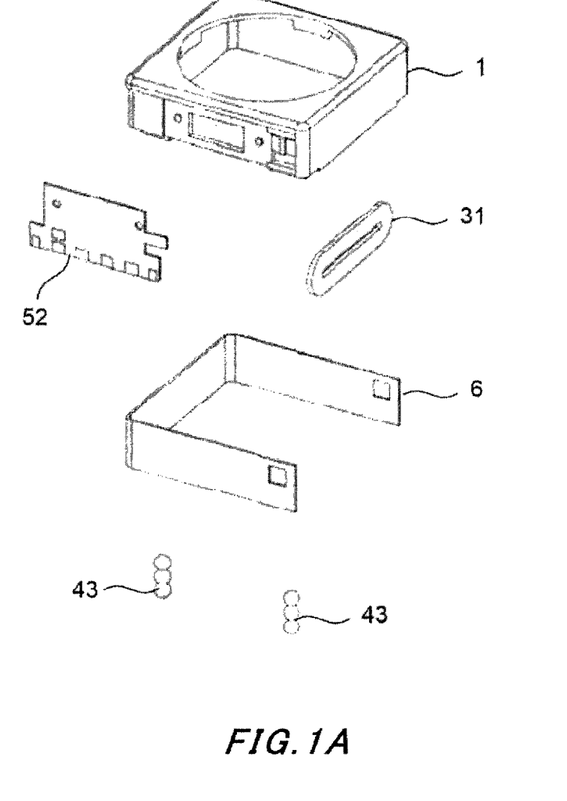
FIGS. 1A and 1B are exploded perspective views that show the configuration of a lens driving apparatus.
Figure 1B:
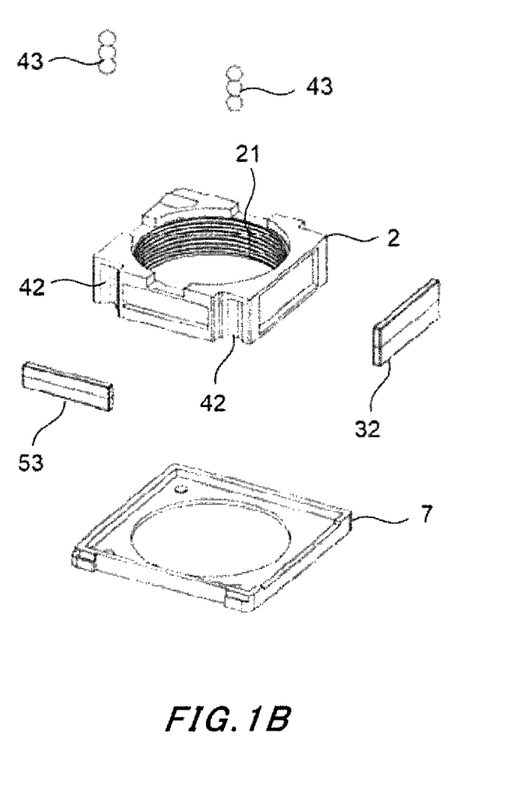

FIGS. 1A and 1B are exploded perspective views that show the configuration of a lens driving apparatus. The lens driving apparatus is configured with a cover 1, a bobbin 2, a plate 6 and a base 7, and comprises a drive unit, a support unit and a detecting unit. FIG. 1A shows the cover 1 and the plate 6, and FIG. 1B shows the bobbin 2 and the base 7. Balls 43 to be inserted between the cover 1 and the bobbin 2 are shown in both FIG. 1A and FIG. 1B to indicate the relationship between FIG. 1A and FIG. 1B.

The bobbin 2 comprises a lens holding unit 21 that holds a lens (not illustrated), and moves within the cover 1 in the optical axis-direction of the lens (the vertical direction on the sheet of paper). In one example, the bobbin 2 is formed into a polygonal cylindrical shape having a square top surface by using resin.

The drive unit is configured with a coil 31 attached to the cover 1 and a drive magnet 32 attached to the bobbin 2. The drive magnet 32 has magnetic poles that are different in the optical axis-direction of the lens (the up-down directions in the figure). An upward electromagnetic force can be provided to the bobbin 2 by a current flowing through the coil 31, and a downward electromagnetic force can be provided to the bobbin 2 by a reverse current.

That is, the bobbin 2 can be driven to be at any position in the up-down directions by controlling a current flowing through the coil 31.

Figure 2A:
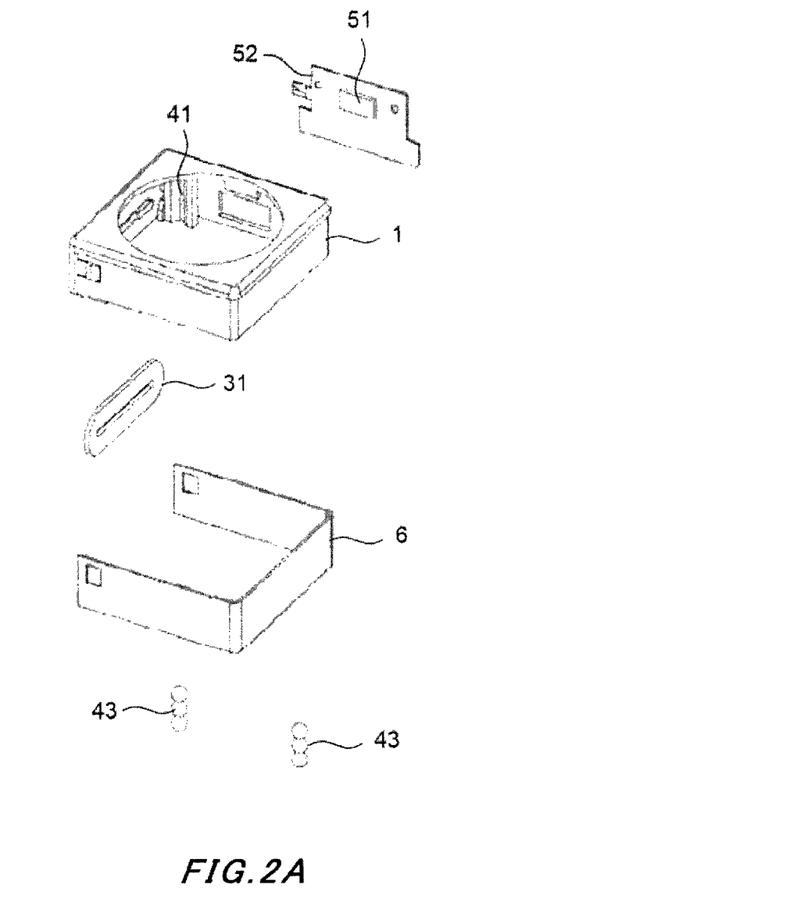
FIGS. 2A and 2B are exploded perspective views that show the configuration of the lens driving apparatus.
Figure 2B:
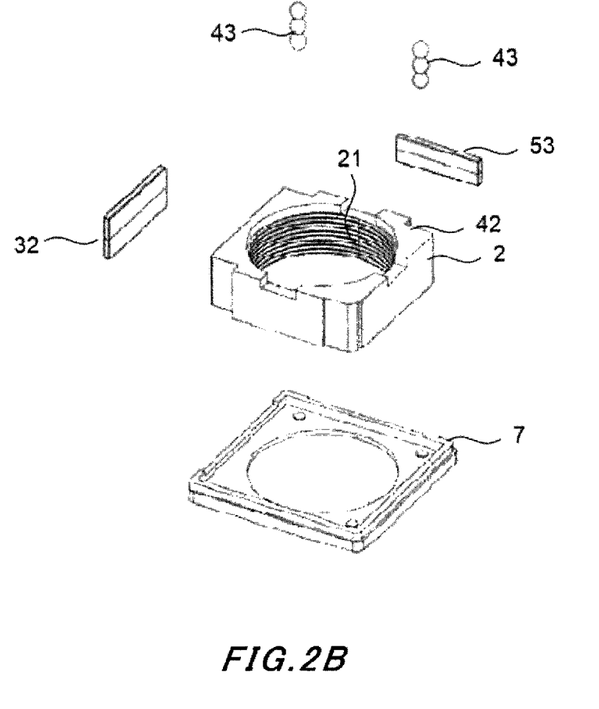

The support unit is configured with two first grooves 41 provided to the cover 1, two second grooves 42 provided to the bobbin 2, and three balls 43 disposed between the first grooves 41 and the second grooves 42. Although the first grooves 41 are not shown in Figs. 1A and 1B, the first groove 41 is shown in FIG. 2A that is an exploded perspective view seen from the opposite side of FIGS. 1A and 1B. Although only one first groove 41 is shown in FIG. 2A, another one first groove 41 is provided to a rear portion of the cover 1 main body that is symmetrical about the left-right directions. The two first grooves 41 and the two second grooves 42 face each other. Note that the number of the balls 43 may not be three, but two, or four or larger. The numbers of the first grooves 41 and second grooves 42 may not be two, but three or larger, but is preferably two for attaining stable support.

The bobbin 2 is pressed against and supported by the cover 1 via the balls 43. Because the balls 43 contact the first grooves 41 and the second grooves 42 and roll, the bobbin 2 moves in the optical axis-direction (the up-down directions in the figure) without much resistance.

The detecting unit is configured with a hole element 51, a base plate 52 for mounting the hole element 51 on the cover 1, and a detection magnet 53 to be mounted on the bobbin 2. The hole element 51 detects the magnetic field of the detection magnet 53, and detects the position of the bobbin 2 (relative position to the cover 1).

When the position of the bobbin 2 detected by the detecting unit and a desired arrangement position of the bobbin 2 do not match, current is caused to flow through the coil 31, and the bobbin 2 can be moved by the drive unit.

Figure 3:
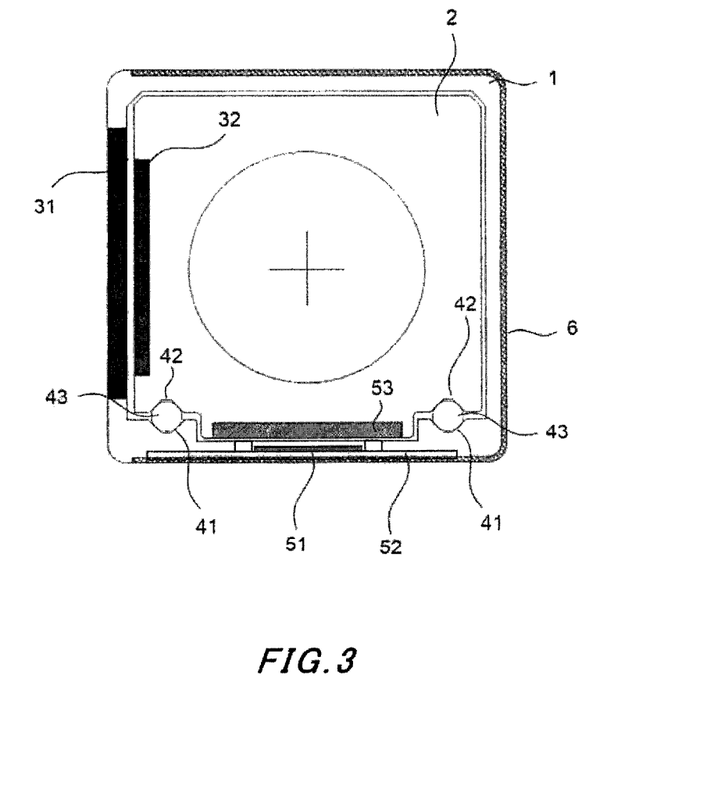
FIG. 3 is a cross-sectional view that shows the configuration of the lens driving apparatus.

FIG. 3 is a cross-sectional view that shows the configuration of the lens driving apparatus. While exploded perspective views are shown in FIGS. 1A, 1B, 2A and 2B, FIG. 3 shows the lens driving apparatus with its configuration not decomposed.

The drive unit (the coil 31 and the drive magnet 32) is provided to one side of a rectangle of the cover 1 and bobbin 2 that have rectangular sections. The support unit (the first grooves 41, the second grooves 42 and the balls 43) and the detecting unit (the hole element 51, the base plate 52 and the detection magnet 53) are provided to another side orthogonal to the one side to which the drive unit is provided. Note that the one side to which the drive unit is provided and the other side to which the support unit and the detecting unit are provided may not be orthogonal to each other, but only have to be not parallel (the reason for this is explained later).

The drive unit is provided only to one side of the rectangle. Here, there is an issue: when the bobbin 2 is to be moved by the drive unit, how the surfaces of the bobbin 2 facing the other three sides (without the drive unit) can be moved by the distance equal to the moving distance of the surface to which the drive unit is provided. When the moving distances are not equal, the bobbin 2 inclines relative to the cover 1, i.e., to the optical axis, and the optical axis of a lens inclines accordingly.

Figure 4A:
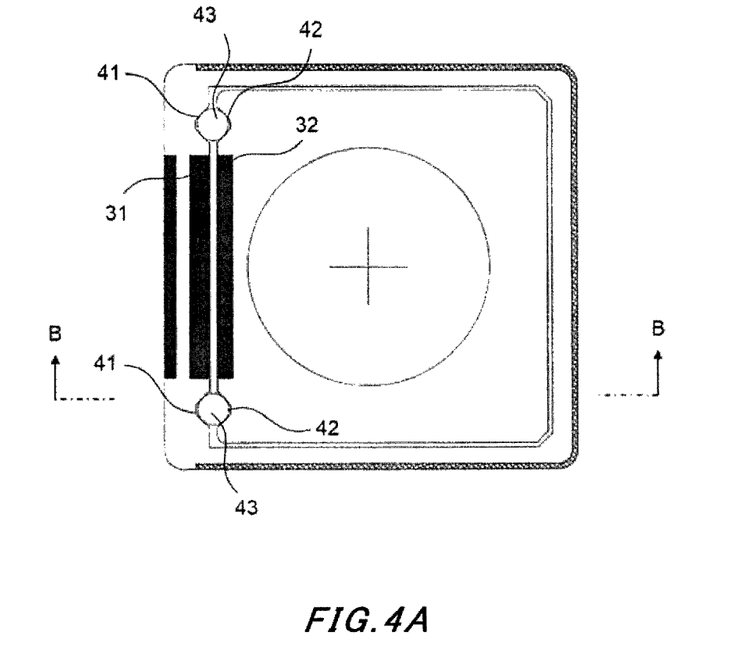
FIGS. 4A and 4B are figures for explaining actions of a support unit.
Figure 4B:
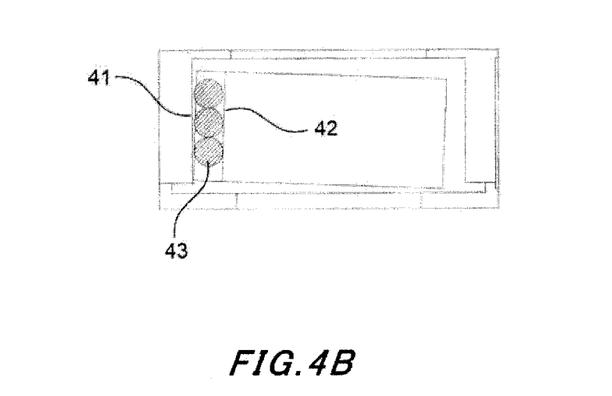

FIGS. 4A and 4B are figures for explaining actions of the support unit. FIGS. 4A and 4B correspond to conventional techniques. The support unit that is, in FIG. 3, provided to another side orthogonal to one side to which the drive unit is provided is provided to the same side as the drive unit (see FIG. 4A).

FIG. 4B shows a section taken through the line B-B in FIG. 4A. The bobbin 2 is moved upward in the figure by the drive unit. It is assumed that the gravitational force that acts in the downward direction in the figure is acting on the bobbin 2.

Depending on the machining accuracy of the first grooves 41 and second grooves 42, gaps may be formed between respective ones of the first grooves 41 and second grooves 42, and the balls 43. Also, the cover 1 and the bobbin 2 may be separated. For this reason, as shown in FIG. 4B, the bobbin 2 may incline relative to the cover 1, that is, to the optical axis.

So far, an example in which the support unit is provided to the same side as the drive unit has been explained. Inclination of the bobbin 2 relative to the cover 1, that is, to the optical axis as shown in FIG. 4B happens similarly in a case where the support unit is not provided to the same side as the drive unit, but to a side parallel with the side to which the drive unit is provided.

Figure 5A:
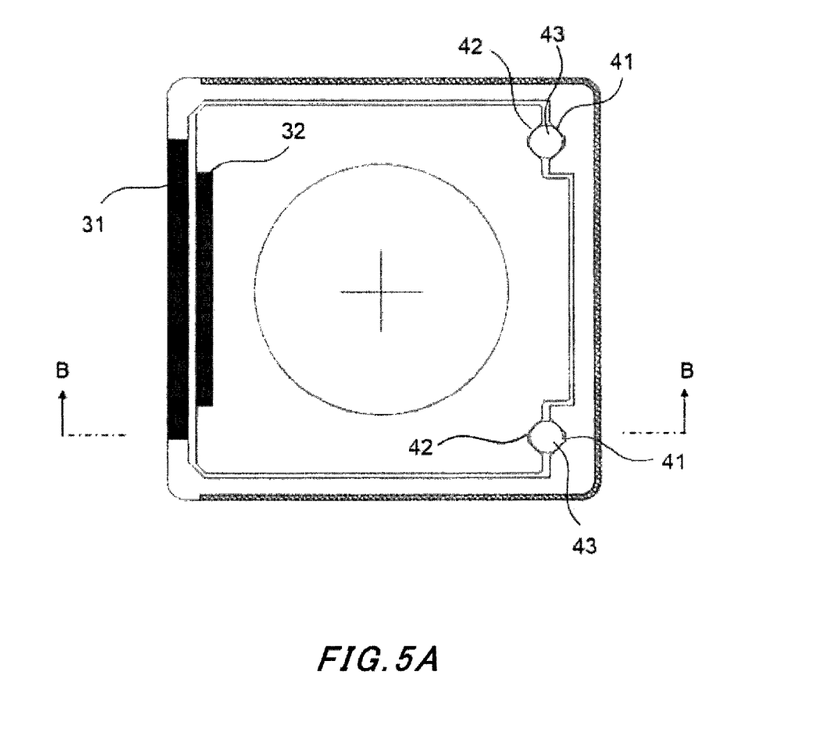
FIGS. 5A and 5B are figures for explaining actions of the support unit.
Figure 5B:
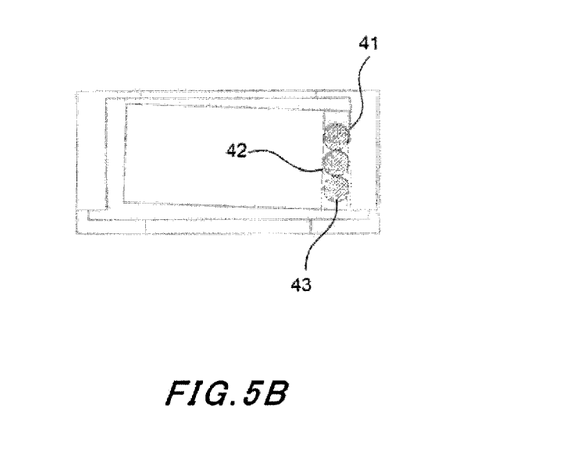

FIGS. 5A and 5B are figures for explaining actions of the support unit. FIGS. 5A and 5B correspond to conventional techniques like FIGS. 4A and 4B (see Patent literature 2). The support unit is provided to a parallel side facing the drive unit.

Figure 6A:
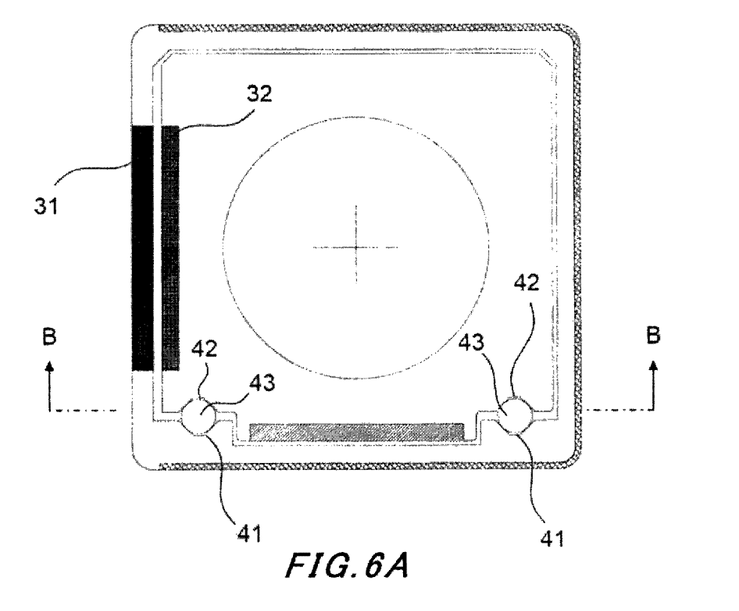
FIGS. 6A, 6B and 6C are figures for explaining actions of the support unit.
Figure 6B:
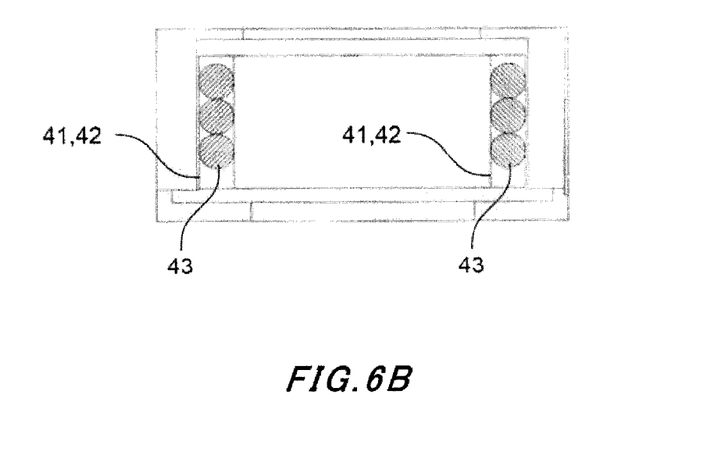
Figure 6C:
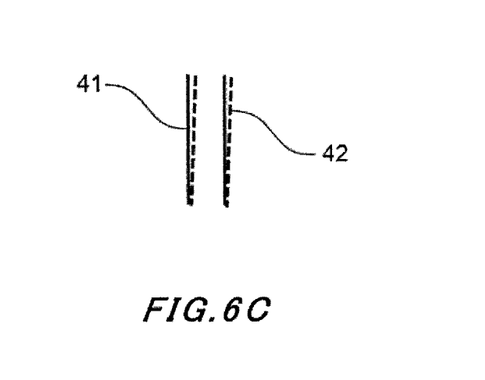

As shown in FIG. 5B, like FIG. 4B, the bobbin 2 inclines relative to the cover 1, that is, to the optical axis. FIGS. 6A, 6B and 6C are figures for explaining actions of the support unit. FIGS. 6A, 6B and 6C relate to the present embodiment, and FIG. 6A corresponds to the one shown in FIG. 3. The support unit is provided to another side orthogonal to the side to which the drive unit is provided.

FIG. 6B shows a section taken through the line B-B in FIG. 6A. The bobbin 2 is moved upward in the figure by the drive unit. It is assumed that the gravitational force that acts in the downward direction in the figure is acting on the bobbin 2.

The following description explains that generation of gaps between respective ones of the first grooves 41 and second grooves 42, and the balls 43, and separation between the cover 1 and the bobbin 2 are prevented, and the bobbin 2 never inclines relative to the cover 1, that is, to the optical axis.

Because, in the figure, the electromagnetic force to drive the bobbin 2 upward acts on the left side, and the gravitational force to drive the bobbin 2 downward acts on the (entire) right side, the bobbin 2, when it inclines relative to the cover 1, rotates clockwise in the figure. In FIGS. 4A and 4B, such rotation can occur because of generation of gaps between respective ones of the first grooves 41 and second grooves 42, and the balls 43, and separation between the cover 1 and the bobbin 2. However, in FIGS. 6A, 6B and 6C, such rotation causes misalignment in the facing relationship between the first grooves 41 and the second grooves 42 as shown in FIG. 6C. The first grooves 41 (solid lines in the figure) provided to the cover 1 are immovable, and the second grooves 42 provided to the bobbin 2 incline (broken lines in the figure). The balls 43 prevent inclination like the one shown in FIG. 6C.

So far, an example in which the side to which the drive unit is provided and the other side to which the support unit is provided are orthogonal to each other has been explained. Even when they are not orthogonal, as long as the side to which the drive unit is provided and the other side to which the support unit is provided are not parallel, misalignment in the facing relationship between the first grooves 41 and the second grooves 42 as shown in FIG. 6C is prevented. As long as they are not parallel, they do not have to be orthogonal. Because when they are orthogonal, inclination of the bobbin 2 can be most efficiently prevented, they are preferably orthogonal.

Figure 7:
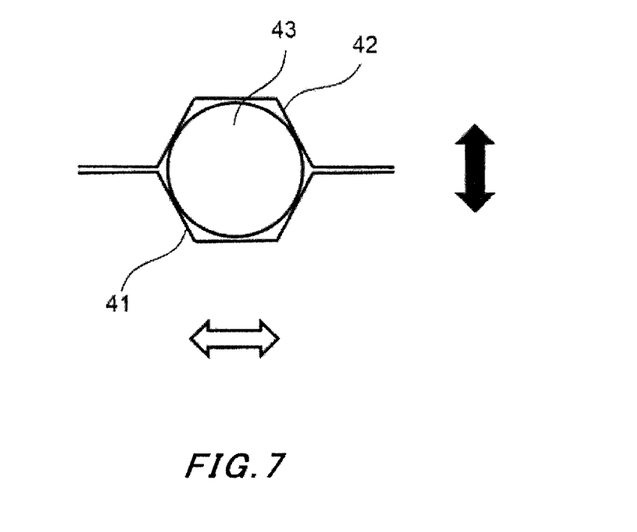
FIG. 7 is a cross-sectional view for explaining details of the support unit.

FIG. 7 is a cross-sectional view for explaining details of the support unit. The first grooves 41 and the second grooves 42 have V-shapes whose width decreases as the depth from the opening portions at which the first grooves 41 and the second grooves 42 face each other increases (the V-shapes excluding acute angle portions at their lower edges). The balls 43 contact the first grooves 41 and the second grooves 42 at two points, respectively. The first grooves 41 and the second grooves 42 are never misaligned in the direction of the while arrow in the figure, and inclination of the bobbin 2 is prevented.

The support unit is provided to the same side as the detecting unit. Thereby, the plate 6 (or the base plate 52) formed with a magnetic body (iron) is attracted also to the cover 1 because of the plate 6 being attracted to the bobbin 2 due to the detection magnet 53. Separation between the cover 1 and the bobbin 2 is prevented, and it can be ensured that the balls 43 contact the first grooves 41 and the second grooves 42 at two points, respectively. Note that misalignment in the direction of the black arrow in FIG. 7 can also be prevented. Inclination of the bobbin 2 in a case where the electromagnetic force of the drive unit is uneven due to the influence of the gravitational force and the frictional resistance between the balls 43, and the first grooves 41 and second grooves 42 in FIG. 6A is prevented.

By providing at least one of the second grooves 42 to a side not parallel with the side to which the drive unit is provided, inclination of the bobbin 2 is prevented. Such an example is shown below.

Figure 8:
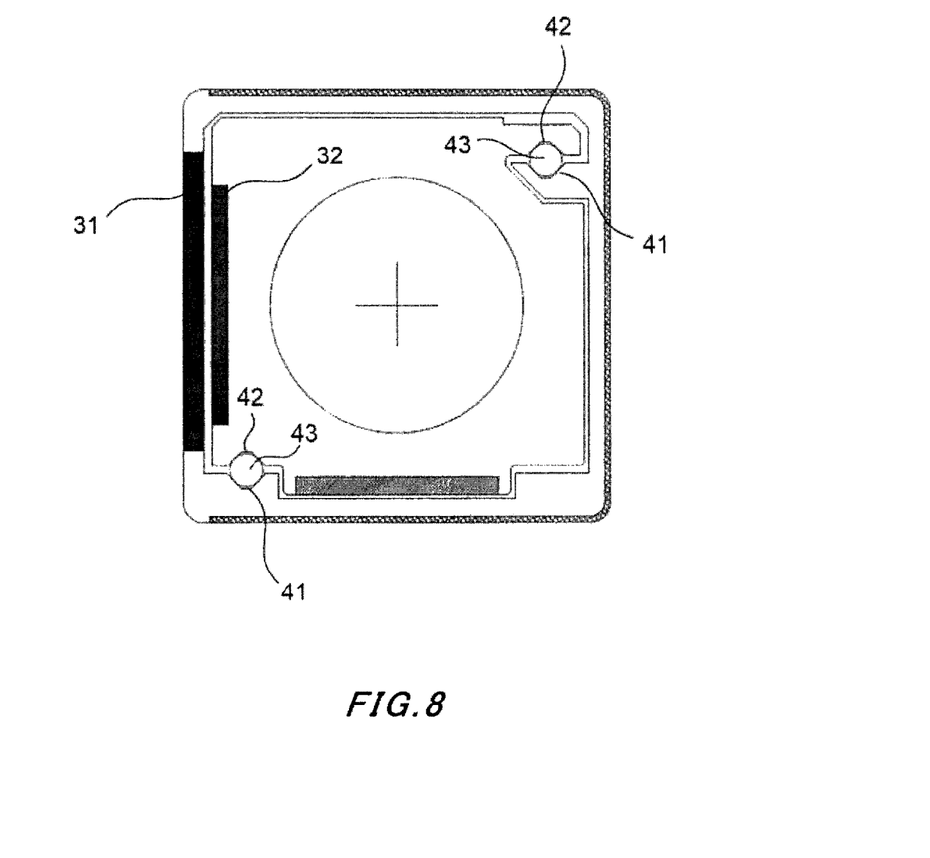
FIG. 8 is a figure that shows an example of the lens driving apparatus.

FIG. 8 is a figure that shows an example of the lens driving apparatus. Two second grooves 42 are provided to different sides. The two sides to which the second grooves 42 are provided are both orthogonal to the side to which the drive unit is provided. As in the one shown in FIGS. 6A, 6B and 6C, because misalignment in the facing relationship between the first grooves 41 and the second grooves 42 does not occur, the bobbin 2 never inclines.

Figure 9:
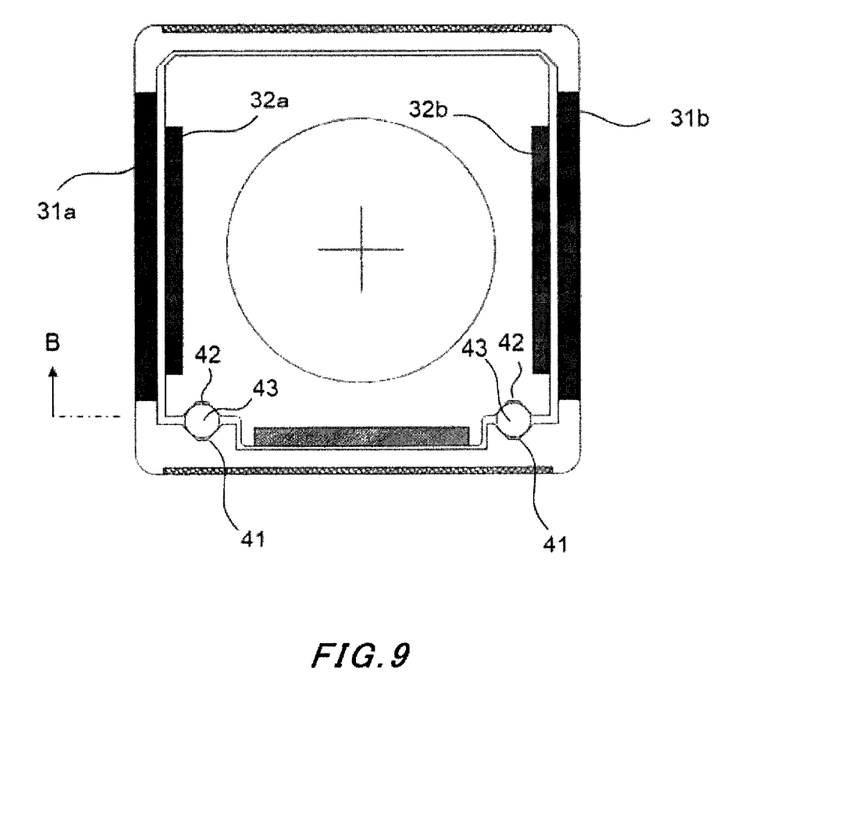
FIG. 9 is a figure that shows an example of the lens driving apparatus.

FIG. 9 is a figure that shows an example of the lens driving apparatus. The support unit is provided at the position which is the same as that shown in FIGS. 6A, 6B and 6C. A difference from the one shown in FIGS. 6A, 6B and 6C is that two drive units (two sets (31*a* and 31*b*, and 32*a* and 32*b*) of the coil 31 and drive magnet 32) are provided to facing sides.

Because the bobbin 2 is driven by the two drive units, a situation never occurs where a side facing the drive unit does not move (or moves slowly) due to the influence of the gravitational force, which occurs when only a single drive unit is provided. In combination with the effect of the support unit, inclination of the bobbin 2 can surely be prevented.

As explained in detail above, the lens driving apparatus 1 according to the present embodiment can drive the bobbin 2 in the optical axis-direction without inclining it.

Second Embodiment

The present embodiment has a structure different from that in the first embodiment. Bobbin inclination prevention by the first grooves 41, the second grooves 42 and the balls 43, and mechanisms of the bobbin 2, the drive unit and the detecting unit are the same as those in the first embodiment, and explanation thereof is omitted.

Figure 10A:
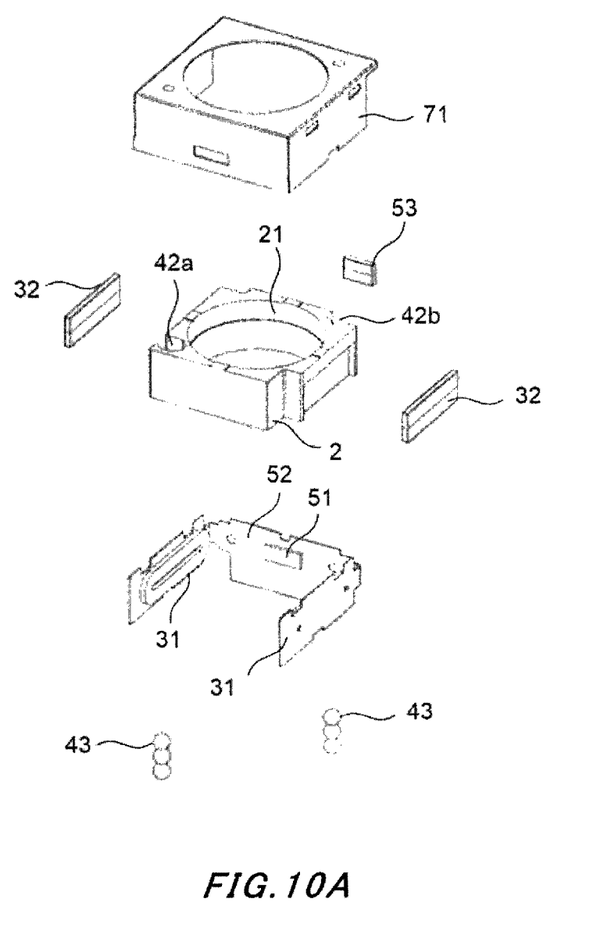
FIGS. 10A and 10B are exploded perspective views that show the configuration of the lens driving apparatus.
Figure 10B:
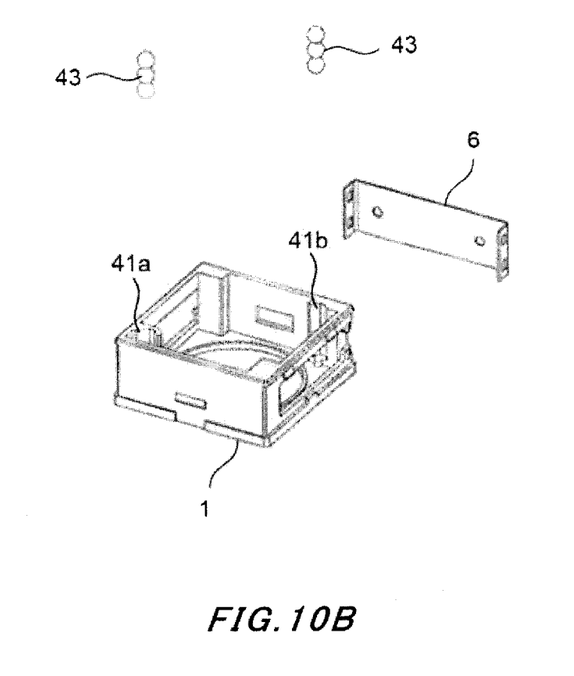

FIGS. 10A and 10B are exploded perspective views that show the configuration of the lens driving apparatus. The lens driving apparatus is configured with the cover 1, the bobbin 2, the plate 6 and a top cover 71, and comprises the drive unit, the support unit and the detecting unit. FIG. 10A shows the bobbin 2 and the top cover 71, and FIG. 10B shows the cover 1 and the plate 6. The balls 43 to be inserted between the cover 1 and the bobbin 2 are shown in both FIG. 10A and FIG. 10B to indicate the relationship between FIG. 10A and FIG. 10B.

In contrast to the one according to the first embodiment (see FIGS. 1A and 1B), the cover 1 is disposed at a lower portion. Strictly speaking, one that is formed by integrating the base 7 and the cover 1 in the first embodiment corresponds to the cover 1 of the present embodiment, and the top cover 71 to cover an upper portion is added.

Two drive units (the coils 31 and the drive magnets 32) are provided to facing sides. Thereby, the gravitational force that acts on a side facing the drive unit can be ignored, and inclination of the bobbin 2 decreases.

The detecting unit (the hole element 51, the base plate 52 and the detection magnet 53) are provided to a side to which the drive unit is not provided.

The support unit is configured with two first grooves 41 provided to the cover 1, two second grooves 42 provided to the bobbin 2, and three balls 43 disposed between the first grooves 41 and the second grooves 42. Two support units (one formed with a first groove 41*a* and a second groove 42*a*, and another with a first groove 41*b* and a second groove 42*b*) are provided. Hereinafter, the one formed with the first groove 41*a* and the second groove 42*a* is referred to as a support unit and the one formed with the first groove 41*b* and the second groove 42*b* is referred to as a support unit.

The support units are provided to the same surface as the detecting unit.

Bobbin inclination prevention is ensured by bringing the cover 1 and the bobbin 2 close to each other by the detection magnet 53. Also, bobbin inclination prevention is further ensured by providing the detection magnet 53 to a surface not parallel with the surfaces to which the two drive units are provided.

Figure 11A:
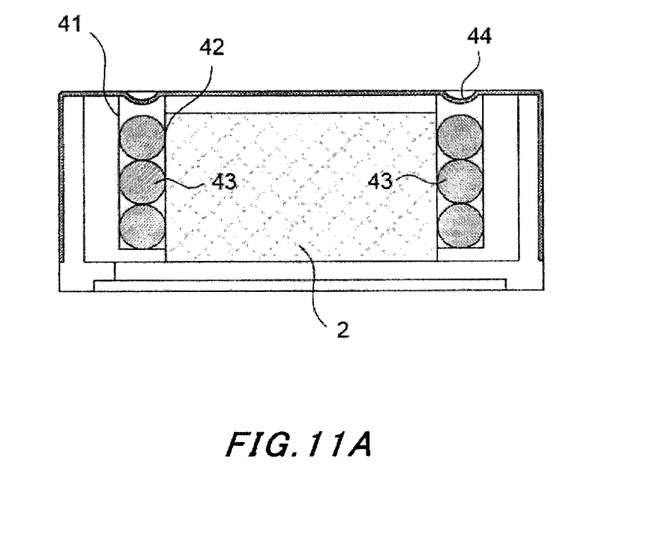
FIGS. 11A and 11B are figures that show a ball locking tool.
Figure 11B:
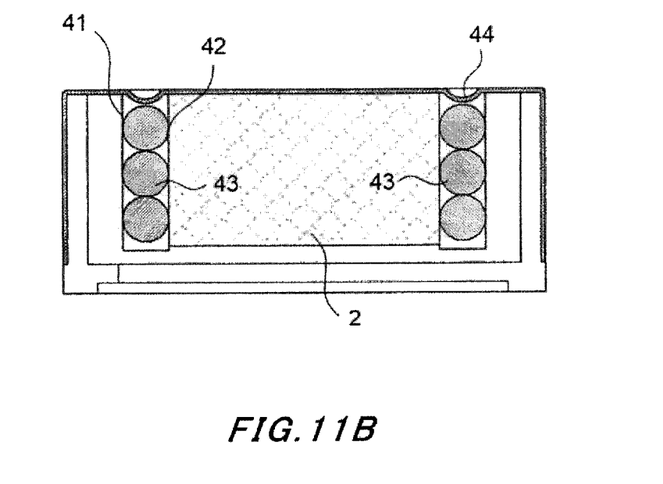

FIGS. 11A and 11B are figures that show a ball locking tool. The figures show sections of portions to which the support units are provided. The ball locking tool 44 (protrusion) is provided above the balls 43 in the top cover 71, and stabilizes the balls 43 between the cover 1 and the bobbin 2.

Note that as the ball locking tool 44, a resin member or the like may be used in place of the protrusion of the top cover 71.

INDUSTRIAL APPLICABILITY

The lens driving apparatus according to one aspect of the present invention is suited to driving a lens in its optical axis-direction without inclining it.

EXPLANATION OF REFERENCE SYMBOLS

1: cover
2: bobbin
21: lens holding unit
3: drive unit
31: coil
32: drive magnet
4: support unit
41: first groove
42: second groove
43: ball
44: ball locking tool
5: detecting unit
51: hole element
52: base plate
53: detection magnet
6: plate
7: base
71: top cover

What is claimed is:
1. A lens driving apparatus comprising:
a polygonal cylindrical bobbin that houses a lens;
a box-shaped cover that receives the bobbin;
a drive unit that moves the bobbin in an optical axis-direction of the lens; and
a support unit that supports the bobbin and guides the bobbin in the optical axis-direction, wherein
the drive unit is configured with a coil and a drive magnet,
the coil is mounted on at least one inner surface of inner surfaces of the cover, the drive magnet: is housed at a drive surface which is an outer surface of the bobbin and faces the coil; and has magnetic poles that are different at both sides in the optical axis-direction,
the support unit is configured with a plurality of first grooves, a plurality of second grooves and balls, the plurality of first grooves are provided to at least two locations of an inner circumference of the cover, and extend in parallel with the optical axis-direction, the plurality of second grooves extend in parallel with the optical axis-direction of the lens, and face respective ones of the plurality of first grooves, the number of the plurality of second grooves being the same as the number of the plurality of first grooves;

each of the balls is disposed between one of the plurality of first grooves and one of the plurality of second grooves facing the one of the plurality of first grooves, the plurality of second grooves are provided to opposite corners of a support surface of the bobbin, a detection magnet is mounted on the support surface of the bobbin that is substantially orthogonal to the drive surface, and the plurality of first grooves are provided to opposite corners of a same support surface of the cover opposite the support surface of the bobbin, whereby the support unit and the detection magnet are both provided on a same side of the bobbin which is substantially orthogonal to another side of the bobbin on which the drive unit is provided.

2. The lens driving apparatus according to claim 1, wherein the plurality of second grooves provided to the support surface and the plurality of first grooves facing the plurality of second grooves have shapes whose width decreases as a depth from opening portions at which the plurality of first grooves and the plurality of second grooves face each other increases.

3. The lens driving apparatus according to claim 1, wherein at least one of the plurality of second grooves provided to the support surface and the plurality of first grooves facing the plurality of second grooves has a V-shaped section.

4. The lens driving apparatus according to claim 1, wherein
the detection magnet is configured with: a base plate on which a hole element to be mounted on one of the inner surfaces of the cover is installed; and the detection magnet mounted on the support surface of the bobbin that is substantially orthogonal to the drive surface faces the base plate.

5. The lens driving apparatus according to claim 4, wherein the detection magnet is provided at a position that allows the cover and the bobbin to be brought close to each other and allows the balls disposed between the plurality of first grooves and the plurality of second grooves facing the plurality of first grooves to abut on the plurality of first grooves and the plurality of second grooves.

6. The lens driving apparatus according to claim 5, wherein one of the plurality of second grooves is disposed at a portion of the detection surface, the portion corresponding to each of both sides of the base plate.

7. The lens driving apparatus according to claim 1, further comprising another drive unit that moves the bobbin in the optical axis-direction of the lens, wherein
the other drive unit is configured with another coil and another drive magnet,
the other coil is mounted on another inner surface of the cover facing the at least one inner surface of the cover on which the coil is mounted, and
the other drive magnet: is housed at another drive surface which is another outer surface of the bobbin facing the drive surface of the bobbin, and faces the other coil; and has magnetic poles that are different at both sides in the optical axis-direction.

* * * * *